US010223595B2

(12) United States Patent
Citerin et al.

(10) Patent No.: US 10,223,595 B2
(45) Date of Patent: Mar. 5, 2019

(54) METHODS, DEVICES AND COMPUTER PROGRAMS FOR TRACKING TARGETS USING INDEPENDENT TRACKING MODULES ASSOCIATED WITH CAMERAS

(71) Applicant: CANON KABUSHIKI KAISHA, Tokyo (JP)

(72) Inventors: Johann Citerin, Cesson-Sevigne (FR); Julien Sevin, Aubin du Cormier (FR); Gerald Kergourlay, Chevaigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 15/381,495

(22) Filed: Dec. 16, 2016

(65) Prior Publication Data

US 2017/0177947 A1    Jun. 22, 2017

(30) Foreign Application Priority Data

Dec. 18, 2015 (GB) .................................. 1522430.6

(51) Int. Cl.
| | |
|---|---|
| *G06T 7/20* | (2017.01) |
| *G06K 9/00* | (2006.01) |
| *G06T 7/70* | (2017.01) |
| *G06K 9/52* | (2006.01) |
| *G06K 9/62* | (2006.01) |

(52) U.S. Cl.
CPC ..... *G06K 9/00771* (2013.01); *G06K 9/00335* (2013.01); *G06K 9/52* (2013.01); *G06K 9/6201* (2013.01); *G06K 9/6267* (2013.01); *G06T 7/20* (2013.01); *G06T 7/70* (2017.01)

(58) Field of Classification Search
CPC .. G06K 9/00335; G06K 9/00771; G06K 9/52; G06K 9/6201; G06K 9/6267; G06T 7/70
See application file for complete search history.

(56) References Cited

U.S. PATENT DOCUMENTS

2008/0130949 A1\* 6/2008 Ivanov .................. H04N 7/181
382/103

FOREIGN PATENT DOCUMENTS

WO    2013/072401 A2    5/2013

\* cited by examiner

*Primary Examiner* — Siamak Harandi
(74) *Attorney, Agent, or Firm* — Canon U.S.A., Inc. IP Division

(57) ABSTRACT

The present invention relates to determining a trajectory of a target from two streams of images obtained from two sources of images, a sub-image of each of the images of the two streams of images representing an overlapping area of a real scene. After having obtained a target path for each of a plurality of targets, from images of the sources of images, for each of the two streams of images, each target path being obtained from a target tracker associated with a source of image, each of the obtained target paths is split into a plurality of target path portions as a function of each potential target switch along the obtained target path. Then, the trajectory is generated as a function of a plurality of the target path portions.

18 Claims, 6 Drawing Sheets

METHODS, DEVICES AND COMPUTER PROGRAMS FOR TRACKING TARGETS USING INDEPENDENT TRACKING MODULES ASSOCIATED WITH CAMERAS

CROSS REFERENCE TO RELATED APPLICATIONS

This application claims the benefit under 35 U.S.C. § 119(a)-(d) of United Kingdom Patent Application No. 1522430.6, filed on Dec. 18, 2015 and entitled "Methods, devices and computer programs for tracking targets using independent tracking modules associated with cameras". The above cited patent application is incorporated herein by reference in its entirety.

FIELD OF THE INVENTION

The present invention relates in general to video-surveillance systems including tracking modules enabling tracking of targets, and in particular to methods, devices and computer programs for tracking targets using independent tracking modules, each tracking module being associated with a camera.

BACKGROUND OF THE INVENTION

Video surveillance is currently a fast-growing market tending to become increasingly widespread for ubiquitous applications. It can be used today in numerous areas such as crime prevention, private and public areas for security purposes, abnormal events detection, traffic monitoring, customer behaviour, or general data gathering.

Despite an ever-increasing usage, mainstream video-surveillance has strong inherent limitations which lead to poor performance, in particular for solving crimes and offenses, due to the way it is used. Basically, video-surveillance consists in streaming camera footages to be recorded and displayed in real-time to human operators. Unfortunately, only a very limited fraction of camera images can be seen in real-time by humans, the remaining footage recordings being used after-action for batch or forensic activities. However, such a forensic after-action viewing is, in practice, rarely used, both, because it is often too late and useless at this point, and also because it is a time-consuming task to retrieve and track people like offenders across images from several cameras.

To cope with such difficulties, Video Content Analysis software (VCAs) modules have been developed to perform some automatic video analysis so as to trigger alarms, to make video surveillance far more real-time responsive, and to make it easier to exploit the after-action recorded footages, for example for forensic activities or for batch analysis tasks.

Tracking VCAs are used in many applications of video-surveillance, in particular for security applications. A main object of tracking VCAs consists in detecting and tracking target individual displacements (such as humans or vehicles).

Tracking VCAs can be implemented in different system architectures such as mono-camera tracking, multi-camera tracking, and re-identification.

Mono-camera tracking basically consists in tracking individual targets displacements in the field of view of individual cameras while multi-camera tracking (also known as overlapping fusion) aims at tracking individual target displacements, when they are in the field of view of several different cameras at the same time (the cameras share a partly common field of view), and re-identification (also known as non-overlapping fusion, or sparse cameras tracking) is directed to tracking individual target displacements across several remote cameras which do not share a common field of view.

Mono-camera tracking technology has seen impressive progress in the last couple of years due to the introduction of machine-learning-based innovative methods. In particular, there exist very efficient mono-camera tracking algorithms for human detection, based on these methods. They make it possible to perform robust and real-time detections and tracking.

Most of the current mono-camera tracking algorithms are able to use positions, trajectories, and advanced appearance cues to solve tracking issues.

Although mono-camera tracking provides reliable results, tracking errors are unavoidable.

Overlapping of the fields of view (FoV) of cameras in a video-surveillance system used for tracking objects, for example for tracking people in streets, makes it possible to increase tracking accuracy and to solve occlusion problems that may occur in a scene when a tracked object is hidden by another object.

More precisely, a main goal of using cameras having overlapping fields of view is to track objects by combining data from a set of overlapping cameras (overlooking at least partially the same scene, i.e., possibly with a partial overlap of their FoV) and to establish a correspondence across multiple views (track assignment).

There exist solutions derived from the ones implemented in networks of radars used for tracking planes. According to these solutions, the tracking results obtained by individual radars are combined in a data fusion algorithm. Such techniques can be used within networks of cameras to track targets based on fusion of visual features obtained from different cameras.

However, a problem with such an approach is that it is mainly based on location and trajectory cues. Therefore, it requires a very thin calibration of the cameras, so that the positions of the pixels in the images obtained from these cameras are associated very accurately with real-world positions. There exist also high risks of confusion when targets are close one to another or when there are occlusions. Though many occlusion risks are suppressed through the use of several overlapping cameras with different points of view, there is still a high risk of confusion between targets when they are close. Finally, such a solution requires multiple cameras sharing common field of view from different points of view to decrease the risk of occlusions, which is expensive.

To increase the reliability of such methods, tracking of objects through several cameras can be further based on data correspondences between images acquired from different cameras. To that end, features are extracted from images acquired by the cameras of a video-surveillance system and next, they are compared. Such features can be, for example, color histograms. Accordingly, tracking of objects is determined as a function of data correspondences between images and of the relative positions of the cameras from which the images are obtained.

Unfortunately, the results obtained using solutions based on such a method are of poor quality since the cameras have different fields of view, poses, image properties, optics, and so on, that make the use of appearance-based features quite meaningless.

Consequently, there is a need for improving target tracking accuracy using images from several cameras.

SUMMARY OF THE INVENTION

The present invention has been devised to address one or more of the foregoing concerns.

In this context, there is provided a solution enabling reliable determination of target trajectories using images from several cameras.

According to a first object of the invention, there is provided a method for determining a trajectory of at least one target from at least two streams of images obtained from at least two sources of images, a sub-image of each of the images of the at least two streams of images representing an overlapping area of a real scene, the method comprising:

obtaining a target path for each of a plurality of targets, from images of the sources of images, for each of the at least two streams of images, each target path being obtained from a target tracker associated with a source of image;

splitting each of the obtained target paths into a plurality of target path portions as a function of each potential target switch along the obtained target path;

generating the trajectory as a function of a plurality of the target path portions.

The method of the invention for determining a trajectory is robust to calibration errors since the used target trackers do not use location-cue only, but make an intensive use of other features such as appearance. Combined with error-correction features of the fusion performed to generate the trajectory, an approximate location is sufficient to get an accurate fusion. Accordingly, the consequences of calibration errors are reduced. Moreover, the use of target trackers makes it possible to use efficiently image appearance and to solve short distance occlusion issues, identifier switch along a target paths being corrected by data fusion. In addition, the amount of data to be exchanged over a communication network is limited since only metadata results from the target trackers are needed to generate the trajectory. Furthermore, the use of target trackers makes the solution flexible and upgradable.

In an embodiment, the method further comprises a step of grouping target path portions in sets of target path portions, each target path portion of a set of target path portions belonging to a target path obtained from a different target tracker, and a step of linking sets of target path portions, the trajectory being generated as a function of linked sets of target path portions.

In an embodiment, the method comprises a step of generating trajectory chunks representative of target path portions of sets of target path portions, the trajectory comprising combined trajectory chunks.

In an embodiment, the generated trajectory chunks representative of target path portions of sets of target path portions is computed as a function of target path portions of the corresponding set.

In an embodiment, the step of splitting each of the obtained target paths is based on an iterative process.

In an embodiment, the iteration is directed to locations of a target along a target path and wherein the iteration process comprises a step of determining whether a target location along a target path is to be considered as belonging to a currently created target path portion or is to be considered as a first location of a new target path protection.

In an embodiment, a predetermined penalty is applied when considering creating a new target path portion during the step of splitting each of the obtained target paths.

In an embodiment, the step of splitting obtained target paths comprises a step of creating a plurality of schemes for splitting the obtained target paths and a step of selecting a splitting scheme among the plurality of splitting schemes, the obtained target paths being split according to the selected splitting scheme.

In an embodiment, the step of selecting a splitting scheme is based on a distance criterion used to compare at least a distance obtained on the basis of target path portions as determined by a first splitting scheme with a distance obtained on the basis of target path portions as determined by a second splitting scheme.

In an embodiment, the step of selecting a splitting scheme is based on a length criterion of target path portions obtained from at least a first and a second splitting schemes.

In an embodiment, a penalty value is applied to the distance criteria when a target is not detected by a target tracker associated with a source of image, making a distance calculation meaningless.

A second aspect of the invention provides a device for determining a trajectory of at least one target from at least two streams of images obtained from at least two sources of images, a sub-image of each of the images of the at least two streams of images representing an overlapping area of a real scene, the device comprising a processor configured for carrying out the steps of:

obtaining a target path for each of a plurality of targets, from images of the sources of images, for each of the at least two streams of images, each target path being obtained from a target tracker associated with a source of image;

splitting each of the obtained target paths into a plurality of target path portions as a function of each potential target switch along the obtained target path;

generating the trajectory as a function of a plurality of the target path portions.

The device of the invention for determining a trajectory is robust to calibration errors since the used target trackers do not use location-cue only, but make an intensive use of other features such as appearance. Combined with error-correction features of the fusion performed to generate the trajectory, an approximate location is sufficient to get an accurate fusion. Accordingly, the consequences of calibration errors are reduced. Moreover, the use of target trackers makes it possible to use efficiently image appearance and to solve short distance occlusion issues, identifier switch along a target paths being corrected by data fusion. In addition, the amount of data to be exchanged over a communication network is limited since only metadata results from the target trackers are needed to generate the trajectory. Furthermore, the use of target trackers makes the solution flexible and upgradable.

In an embodiment, the processor is further configured for carrying out a step of grouping target path portions in sets of target path portions, each target path portion of a set of target path portions belonging to a target path obtained from a different target tracker, and a step of linking sets of target path portions, the trajectory being generated as a function of linked sets of target path portions.

In an embodiment, the processor is further configured for carrying out a step of generating trajectory chunks representative of target path portions of sets of target path portions, the trajectory comprising combined trajectory chunks.

In an embodiment, the processor is further configured so that the generated trajectory chunks representative of target path portions of sets of target path portions is computed as a function of target path portions of the corresponding set.

In an embodiment, the processor is further configured so that the step of splitting each of the obtained target paths is based on an iterative process.

In an embodiment, the processor is further configured so that the iteration is directed to locations of a target along a target path and so that the iteration process comprises a step of determining whether a target location along a target path is to be considered as belonging to a currently created target path portion or is to be considered as a first location of a new target path protection.

In an embodiment, the processor is further configured so that a predetermined penalty is applied when considering creating a new target path portion during the step of splitting each of the obtained target paths.

In an embodiment, the processor is further configured so that the step of splitting obtained target paths comprises a step of creating a plurality of schemes for splitting the obtained target paths and a step of selecting a splitting scheme among the plurality of splitting schemes, the obtained target paths being split according to the selected splitting scheme.

In an embodiment, the processor is further configured so that the step of selecting a splitting scheme is based on a distance criterion used to compare at least a distance obtained on the basis of target path portions as determined by a first splitting scheme with a distance obtained on the basis of target path portions as determined by a second splitting scheme.

In an embodiment, the processor is further configured so that the step of selecting a splitting scheme is based on a length criterion of target path portions obtained from at least a first and a second splitting schemes.

In an embodiment, the processor is further configured so that a penalty value is applied to the distance criteria when a target is not detected by a target tracker associated with a source of image, making a distance calculation meaningless.

Since the present invention can be implemented in software, the present invention can be embodied as computer readable code for provision to a programmable apparatus on any suitable carrier medium, and in particular a suitable tangible carrier medium or suitable transient carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 3, comprising

FIG. 4, comprising

FIG. 5, comprising

DETAILED DESCRIPTION OF EMBODIMENTS OF THE INVENTION

According to a general embodiment, the invention aims at taking advantage of the improvements that have been made in mono-camera tracking algorithms (or mono-camera trackers), in a fusion algorithm, for tracking targets based on images from several cameras. In other words, embodiments of the invention are based on the use of mono-camera tracking algorithms and on the use of results from these algorithms in a fusion algorithm.

Since it has been observed that image features are specific to each camera from which the corresponding image is obtained, data that are used in the fusion algorithm of embodiments of the invention are basically results from mono-camera tracking algorithms (and not the image features per se), that are less dependent on the characteristics of the cameras that are used.

According to particular embodiments, each target path generated by mono-camera tracking algorithms is split into several target path portions, called tracklets, one tracklet being a portion of a generated target path associated with only one target, with a high level of reliability (i.e. without any target switch along the tracklet).

Since the poses, the distances between the camera and the targets, and image features are different from one camera to another, the inventors observed that combining appropriately the tracklets of several target paths generated from the images of several cameras makes it possible to generate target trajectories whose reliability is higher than each of the generated target paths.

Indeed, in view of the differences between the characteristics of the cameras, one can expect that at least one target path associated with a camera is correct at any given frame (or time) and for any target. Therefore, by choosing reliable results at each frame or each set of frames, i.e. by selecting a camera providing reliable results at each frame or each set of frames, the reliability of the final results is increased.

Figure 1:
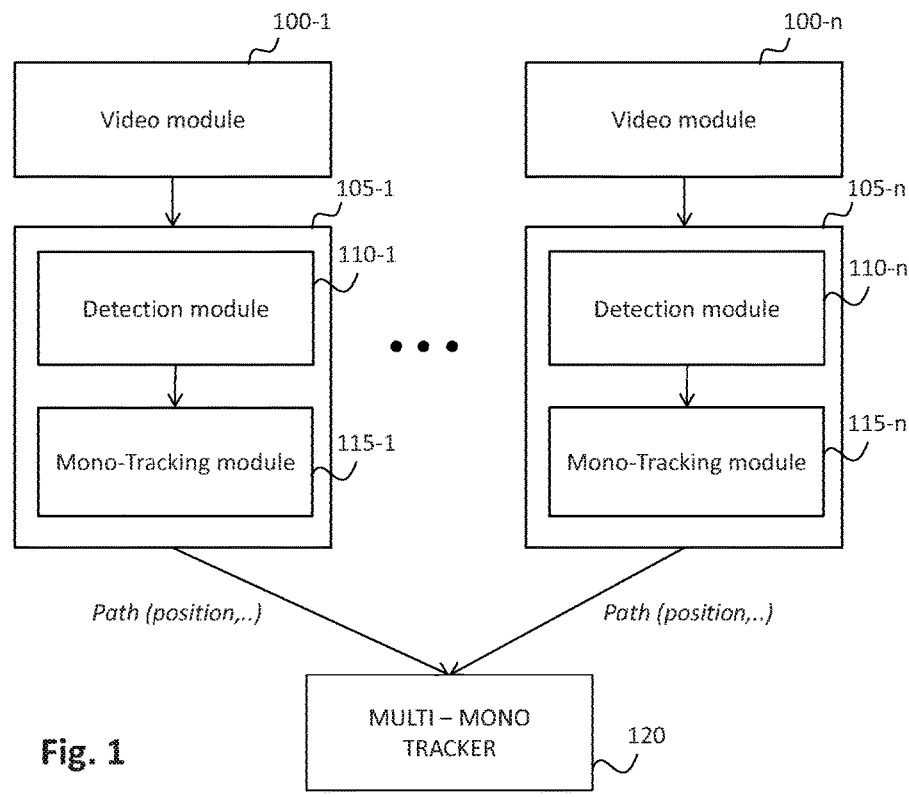
FIG. 1 is a schematic block diagram of a multi-tracker fusion system enabling data provided by mono-camera trackers to be combined, according to embodiments of the invention.

FIG. 1 is a schematic block diagram of a multi-tracker fusion system enabling data provided by mono-camera trackers to be combined, according to embodiments of the invention.

For the sake of illustration, only two cameras are represented. However, it is to be understood that more than two cameras can be used for tracking targets according to embodiments of to the invention (as suggested with the use of index n).

As illustrated, a module comprising a detector module and a mono-tracker module is associated with a video module. For example, module 105-1 comprising detection module 110-1 and mono-camera tracking module 115-1 is associated with video module 100-1 and module 105-$n$ comprising detection module 110-$n$ and mono-camera tracking module 115-$n$ is associated with video module 100-$n$.

A main object of video modules 100-1 and 100-n is to receive sequences of images (or videos) that are typically provided by a local video sensor or by a remote device.

According to particular embodiments, video modules 100-1 and 100-n are embedded within cameras along with modules 105-1 and 105-n (video module 100-1 and module 105-1 being embedded in a first camera and video module 100-n and module 105-n being embedded in a second camera). Alternatively, video modules 100-1 and 100-n as well as modules 105-1 and 105-n belong to a remote device, typically a remote server.

According to the given example, modules 105-1 and 105-n are tracking modules based on a tracking-by-detection algorithm. Each of these modules may comprise a standard detection module (110-1 and 110-n) and a standard mono-camera tracking module (115-1 and 115-n).

Detection modules 110-1 and 110-n may deliver bounding boxes (e.g. x-coordinate, y-coordinate, width, and height) and a corresponding detection score representing a level of confidence associated with each detected object or person, generically referred to as a target in the following, in each image.

The results obtained by the detection modules are used by mono-camera tracking modules 115-1 and 115-n in order to generate target paths with consistent identity labels by relying on object detection in successive images. As mentioned above, mono-camera tracking modules 115-1 and 115-n can be implemented either in cameras or in servers.

In turn, the target paths generated in mono-camera tracking modules 115-1 and 115-n are fed into tracking module 120 to be combined in order to perform a persistent tracking, that is to say to track targets over several cameras and to correct errors of the individual mono-camera tracking modules. Indeed, an error that is generated by a mono-camera tracking module such as a switch of identity between two targets due to an occlusion can be recovered by another tracking module.

Tracking module 120, that comprises a fusion algorithm, generates a path for one, several, or all identified targets based on the target paths generated in the mono-tracking modules associated with cameras of the video-surveillance system.

Tracking module 120 can be referred to as a multi-tracker fusion module per opposition to a standard multi-sensor fusion module. It can be implemented either in a dedicated camera that is referred to as a central camera in that case, or in a server. When tracking module 120 is implemented within a camera, a dedicated protocol between the central camera and the others is advantageously implemented so that all cameras (except the central one) send the results obtained by the associated mono-camera tracking module to the central camera.

Figure 2:
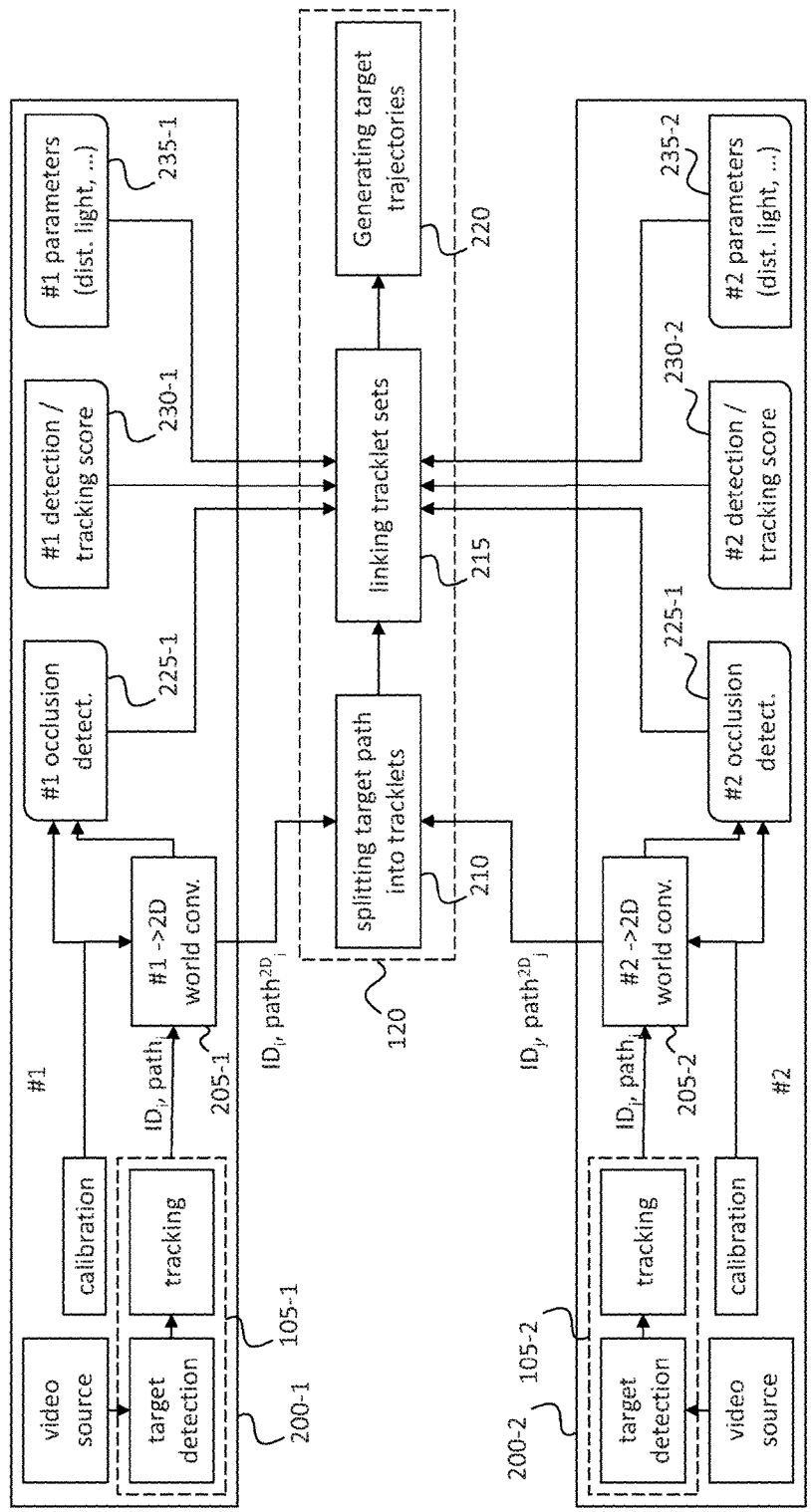
FIG. 2 illustrates steps for generating target trajectories as a function of target paths generated by several mono-camera tracking modules, from images obtained from camera, associated with these tracking modules.

FIG. 2 illustrates steps for generating target trajectories as a function of target paths generated by several mono-camera tracking modules, from images obtained from cameras associated with these tracking modules.

Still for the sake of illustration, only two sources of images are illustrated in FIG. 2. However, it is to be understood that more than two cameras can be used for tracking targets according to embodiments of to the invention.

As illustrated, each of a first and a second camera, denoted 200-1 and 200-2 respectively, comprises a video source, a target detection module, and a tracking module as described by reference to FIG. 1. Each of these cameras further comprises a calibration module used to calibrate the corresponding camera and to store calibration parameters associated with the camera. The set comprising the target detection module associated with camera 200-1 and the tracking module associated with the same camera may form module 105-1 as illustrated in FIG. 1. Likewise, the set comprising the target detection module associated with camera 200-2 and the tracking module associated with the same camera may form module 105-2.

Such modules 105-1 and 105-2 can be referred to as mono-camera trackers. They are configured to generate target paths that may comprise, in particular, a target identifier ($ID_i$ and $ID_j$) and a path ($path_i$ and $path_j$), as illustrated.

According to particular embodiments, the target paths generated by the tracking modules are expressed in a coordinate system associated with the images from which the target paths have been generated. Therefore, the coordinate systems of the cameras are different.

In order to generate target trajectories, the target paths generated by the tracking modules may be converted into a two-dimensional (2D) real world coordinate system as illustrated with references 205-1 and 205-2. Such conversions are based on camera settings. By using the assumption that each target (e.g. each tracked person) stands on a planar ground, any standard 2D ground plane projection method can be used. However, there exist methods for converting the coordinates of a target in an image plane of a camera in equivalent coordinates in a coordinate system associated with another camera image plane. Such conversions are based on calibration parameters.

The modules used for generating target paths in a 2D real world coordinate system from images of one camera (e.g. camera 200-1 or camera 200-2), for example modules generically referenced 105 and 205, can be standard modules.

According to particular embodiments, each target path generated by mono-camera trackers are split into tracklets, one tracklet being a portion of a target path associated with only one target, with a high level of reliability. Therefore, each tracklet is associated with a time period of the movement of a target along a real trajectory and each tracklet corresponds to a potential portion of the target trajectory as to be obtained as a final result.

As illustrated in FIG. 2, such a splitting step can be performed into a tracklet generator module 210 of the tracking module 120.

Since the inventors have observed that most of the tracking errors in mono-camera trackers come from a switch of target identities along a target path, target paths are preferably split where it is likely that such a switch take place. Then, by combining tracklets issued from the target paths generated by different mono-camera trackers, it is possible to generate an error free target trajectory.

It is to be recalled that a target switch or an identifier switch occurs when one target is lost along a trajectory and another target is wrongly detected instead, resulting in two or more different targets appearing along one trajectory (although one trajectory is supposed to be one single target only). In other words, a target switch or an identifier switch occurs when the tracking algorithm makes a confusion between two targets. For example, it happens when one target being detected so far on a trajectory associated with an identifier A becomes wrongly detected on a trajectory associated with an identifier B. At the same time, the target on the trajectory associated with the identifier B is detected on the trajectory associated with the identifier A. It means that when errors of this type occur, each trajectory actually corresponds to several different targets and each target is tracked on several different trajectories.

Before being combined to form target trajectories, tracklets are grouped in tracklet sets.

More precisely, the tracklets deemed to be associated with the same target, that correspond to the same time period and that are obtained from target paths issued from different mono-camera trackers, are grouped to form a set of tracklets referred to as a tracklet set. Therefore, each tracklet set comprises one tracklet per camera and the target path portion represented by each tracklet of a tracklet set is close, in terms of distance, to the target path portion represented by the other tracklets of the same tracklet set.

To establish a target correspondance in target paths obtained from different mono-camera trackers and thus, to establish a link between a tracklet obtained from one mono-camera tracker with a tracklet obtained from another mono-camera tracker, tracker information other than the label associated with the trajectory and the trajectory itself can be used, on a standard basis.

It to be noted here that if the tracklets of a set of tracklets correspond to the same target, the target identifiers used by the mono-camera trackers to designate these tracklets may be different. For example, a first mono-camera tracker may assign the target identifier 1 to a target while a second mono-camera tracker may assign the target identifier 2 to the same target. The target identifiers assigned by the mono-camera trackers are merely labels that are consistent within each mono-camera tracker but not between the mono-camera trackers. Accordingly, in a set of tracklets, there is at most one tracklet per camera (one target may be not identified by a camera) and the tracklets of the set of tracklets corresponds to one target identifier per camera.

Since the generated target paths may be split into tracklets by comparing target paths obtained from different mono-camera trackers, as described herein below, the tracklets can be grouped in tracklet sets while being created.

Each tracklet set can be considered as representing a trajectory chunk of a target trajectory. Therefore, determining the trajectory of a target consists in determining a trajectory chunk for each of several tracklet sets and in combining these trajectory chunks.

In other words, determining the real trajectory of a target consists in identifying a linkage of tracklet sets that are compatible one to another and that are such that a linkage of tracklet sets that are compatible one to another exists for each target.

As illustrated in FIG. 2, linking tracklet sets is done in the tracklet set linking module 215 of the tracking module 120. As described herein below, the linkage of tracklet sets may be based on several criteria.

The linkages of tracklet sets are then used to generate target trajectories in the target trajectory generator module 220 of the tracking module 120.

Generating the target trajectories is based on the sets of tracklets and on lists of legitimate connections from a tracklet sets and neighbour tracklet sets (i.e. tracklet sets corresponding to time periods that are immediately before and after the time period corresponding to the considered tracklet set).

Such a step aims at generating a final trajectory for each target, based on the tracklet sets and the legitimate connections. This is done by combining trajectory chunks representative of tracklet sets, following legitimate connections of tracklet sets, while deciding how to generate one single trajectory chunk, starting from several tracklets in each tracklet set associated with the considered target.

Since it is assumed that the tracklets of the same tracklet set correspond to one target, only the uncertainty of the localization of targets by the mono-camera trackers makes the tracklets of the same tracklet set slightly different.

A simple solution to get one single trajectory chunk is to take the average of the different tracklets of the tracklet set. Variants may use weighted average, where weights can be based on detection scores or any other parameters directed to tracking reliability.

As illustrated with references 225-1/225-2, 230-1/230-2, and 235-1/235-2, identifying possible linkages of tracklets may also be based on optional information such as occlusion information, tracking scores, and/or parameters of the cameras.

Figures 3A, 3B:
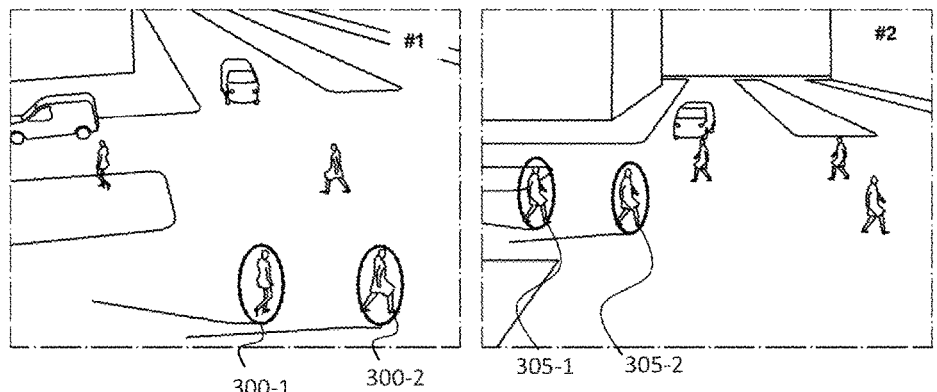
FIGS. 3a to 3e, illustrates an example of generating target paths, splitting the generated target paths into tracklets, and identifying legitimate tracklet set connections.
Figures 3C, 3D:
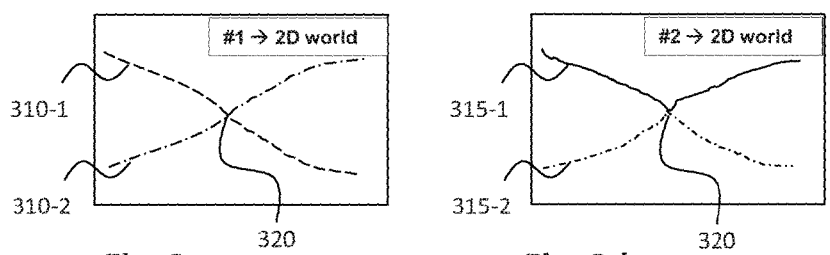
Figure 3E:
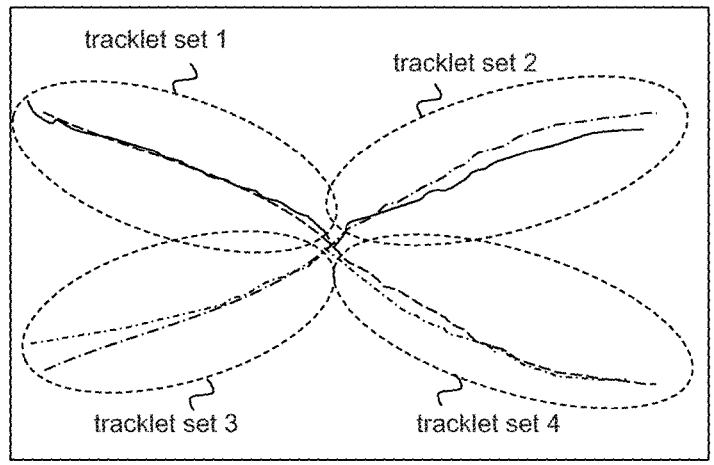

FIG. 3, comprising FIGS. 3a to 3e, illustrates an example of generating target paths, splitting the generated target paths into tracklets, and identifying legitimate tracklet set connections.

FIGS. 3a and 3b illustrate two images obtained from two different cameras denoted #1 and #2. Although several possible targets are present in these images, only two targets are identified in these images along with a portion of their trajectory. For the sake of illustration, targets 300-1 and 300-2 are identified in the images obtained from camera #1 (FIG. 3a) and targets 305-1 and 305-2 are identified in the images obtained from camera #2 (FIG. 3b).

By using a mono-camera tracker and processing several images obtained from camera #1, it is possible to generate target paths 310-1 and 310-2 as illustrated in FIG. 3c. For the sake of illustration, these target paths are represented in a 2D world coordinate system. Likewise, by using a mono-camera tracker and processing several images obtained from camera #2, it is possible to generate target paths 315-1 and 315-2 as illustrated in FIG. 3d.

Each of the target paths represented in FIGS. 3c and 3d may be split into two tracklets by comparing the target paths. For the sake of illustration, the target paths are split at location denoted 320 that represents a possible target switch.

As illustrated, in FIG. 3e, the tracklets may be grouped in four sets of tracklets (tracklet sets 1 to 4).

By analysing these tracklet sets, it may be determined that legitimate tracklet set connections may the following:
 tracklet set 1⇔ tracklet set 2 or
 tracklet set 1⇔ tracklet set 4
 and that
 tracklet set 3⇔ tracklet set 2 or
 tracklet set 3⇔ tracklet set 4

From these legitimate tracklet set connections and from information obtained from the mono-camera trackers, it may be determined that the most probable target paths (i.e. target trajectories) are the following:
 target trajectory 1: tracklet set 1⇒ tracklet set 4
 target trajectory 2: tracklet set 3⇒ tracklet set 2

As described above, a main issue with the target paths generated by mono-camera trackers is the errors that can be made. Such errors generally consist in target switches according to which the trajectory of one target is lost and another target is wrongly detected and tracked in lieu of the initial one. This results in two targets being associated with the same target path.

This problem is solved by the step of splitting the target paths into tracklets wherein each tracklet is a portion of trajectory associated with a single target (or target identifier) with a high level of reliability and by a step of combining tracklets issued from different target paths to generate target trajectories.

Such a splitting step can be based on the use of some cues indicating that one chunk of trajectory most certainly corresponds to one target only.

It is to be noted that over-splitting a target path does not downgrade the reliability of the method based on this splitting step since the trajectories are recreated from tracklets in subsequent steps of the workflow.

Accordingly, when a doubt exists on a target switch at a specific location along a target path, the latter is preferably split at this location.

An example of a cue that can be used to determine whether or not a target path is to be split is the similarity, in terms of distance, between chunks of trajectories in images obtained from different cameras. Indeed, when it may be concluded from the target paths obtained from all or most of the cameras that one chunk of trajectory is associated to the same target, it is most certainly the truth.

Accordingly, by comparing a portion of a target path as generated by a mono-camera tracker of a first camera with portions of target paths as generated by mono-camera trackers of other cameras, one can determine whether or not these portions of trajectory are similar.

If they are similar (in terms of distance), it can be stated that they correspond to the same target. As described above, each of these portions is referred to as a tracklet and these corresponding portions form a tracklet set.

On the contrary, if they are not similar (in terms of distance), it can be concluded that they do not correspond to the same target or that at least a part of these target path portions do not correspond to the same target. If at least a part of these target path portions do not correspond to the same target, each of these portions may be split into several parts, for example two parts. There exist different methods for determining the locations where the portions are to be split, one of the simplest being to determine these locations randomly. More appropriate methods are described herein below.

According to particular embodiments, several splitting schemes of the generated target paths are created and then, one splitting scheme is chosen among them. According to other embodiments, one splitting scheme is created incrementally.

Several criteria can be used for optimizing the splitting of the target paths that have been identified or for selecting one splitting scheme among several, for each of the target paths. Such criteria can be used independently or in combination.

In order to optimize the selection of a splitting scheme among several or in order to create incrementally an optimized splitting scheme, the three following criteria are preferably used in conjunction.

Among these criteria and according to particular embodiments, one is based on the minimum of square distances between target locations along a portion of the target paths, as determined from several cameras.

According to this criterion, a distance is computed for each predetermined scheme for splitting a target path and the splitting scheme associated with the minimum distance (among all the computed distances) is selected.

The computed distance is the sum, for each pair of tracklets, in a set of tracklets, for all the frames used to determine the tracklets of the set of tracklets, for all the tracklet sets associated with the considered target path, of the locations of the considered target within the tracklets of the considered pair of tracklets.

It is recalled that each target detection is usually referred to by a bounding box, which has a location within camera image reference, and a corresponding position within common reference, for example within a 2D world coordinate system as described above.

If it is assumed that:
i represents a first index of tracklet in a tracklet set comprising n tracklets, that is to say a first index of camera (in a set of n cameras);
j represents a second index of tracklet in the tracklet set, that is to say a second index of camera (in the set of n cameras);
k represents a index of tracklet sets (assuming there are K tracklet sets associated with the considered target path);
$\vec{x}_i(t)$ represents the location of the considered target in frame $t_k$ obtained from camera i (the number of frames associated with the tracklet set k being Tk);
the distance $dist_s$ associated with splitting scheme s can be computed as follows:

$$dist_s = \sum_{k=1}^{K} \sum_{t_k=1}^{T_k} \sum_{i=1}^{n} \sum_{j=1, j\neq i}^{n} (\vec{x}_i(t_k) - \vec{x}_j(t_k))^2$$

Accordingly, the splitting scheme s to be selected among a number S of previously determined splitting schemes may be determined as follows:

$$s: \min_{s}(dist_s)$$

Still according to particular embodiment, a second criterion may be used, for example if more than one splitting scheme correspond to the minimum distance (i.e. if the same minimum distance is obtained for two different splitting schemes). Such a second criterion may correspond to the mean length of tracklets. It may be used to avoid splitting the target paths into tracklets corresponding to single locations.

Again, if it is assumed that:
i represents an index of tracklet in a tracklet set comprising n tracklets, that is to say an index of camera (in a set of n cameras);
k represents a index of tracklet sets (assuming there are K tracklet sets associated with the considered target path);
$\vec{x}_i(t)$ represents the location of the considered target in frame $t_k$ obtained from camera i (the number of frames associated with the tracklet set k being Tk);
the mean length of tracklets associated with splitting scheme s, denoted $MLength_s$, can be computed as follows:

$$MLength_s = \frac{1}{n \times K} \sum_{k=1}^{K} \sum_{t_k=2}^{T_k} \sum_{i=1}^{n} (\vec{x}_i(t_k) - \vec{x}_i(t_k - 1))^2$$

Accordingly, the splitting scheme s' to be selected among a number S' of splitting schemes that have been preselected among a number S of predetermined splitting schemes, may be determined as follows:

$$s': \max_{s'}(MLength_{s'})$$

It is to be noted that a mono-camera tracker may fail to detect a target in a particular frame. In such a case, according to particular embodiments, the distance computed for a pair of tracklets (i, j) may be replaced by a penalty value that may correspond, for example, to the sum of a predetermined fail value associated with camera i denoted $F_i$ and of a predetermined fail value associated with camera j denoted $F_j$. Accordingly, $\vec{x}_i(t_k)-\vec{x}_j(t_k)=F_i+F_j$.

An object of such a way of processing detection failures is to take into account that a camera fails in tracking a target. In such a situation, it may be of importance to avoid a wrong assignation of a target to a target path.

Still according to particular embodiments, the penalty value is chosen so that detection of the target in both considered frames is always preferred to a detection failure. To that end, it may be considered that the penalty value is set as the worst distance when detections occur in the two considered frames. Accordingly, such a penalty value may be set to the sum of the maximum calibration errors of the two considered cameras (i.e. cameras i and j).

FIG. 4, FIGS. 4a to 4c, illustrates an example of selecting one splitting scheme of a target path, among several splitting schemes, according to specific criteria.

According to the example given in FIG. 4, the target paths that are to be split are those described by reference to FIGS. 3c and 3d.

Figure 4A:
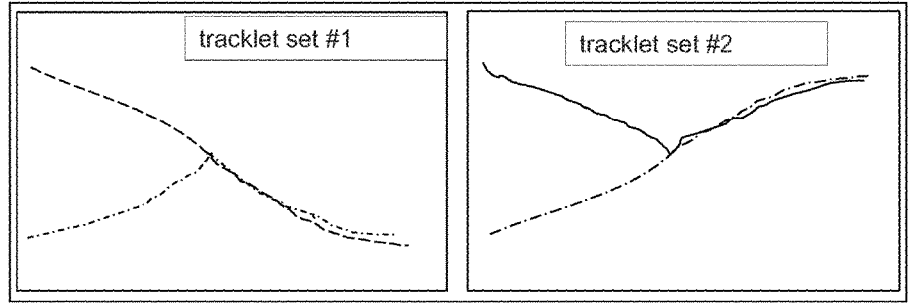
FIGS. 4a to 4c, illustrates an example of selecting one splitting scheme of a target path, among several splitting schemes, according to specific criteria.

As illustrated in FIG. 4a, two tracklet sets corresponding to a first splitting scheme (scheme #1) may be defined so that the first tracklet set (tracklet set #1) comprises a first tracklet corresponding to the full target path denoted 310-1 in FIG. 3c and a second tracklet corresponding to the full target path denoted 315-2 in FIG. 3d. Still according to this first splitting scheme, the second tracklet set (tracklet set #2) comprises a first tracklet corresponding to the full target path denoted 310-2 in FIG. 3c and a second tracklet corresponding to the full target path denoted 315-1 in FIG. 3d.

Figure 4B:
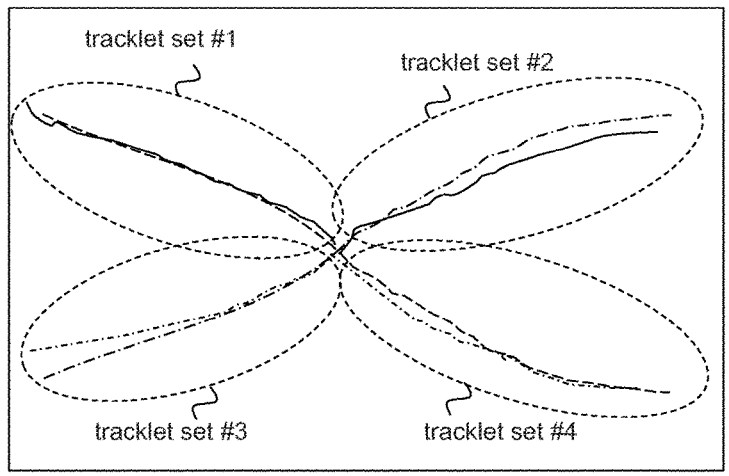

A second splitting scheme (scheme #2) is illustrated in FIG. 4b. According to this splitting scheme, the target paths illustrated in FIGS. 3c and 3d are split into four tracklet sets, each comprising two tracklets. The first tracklet set (tracklet set #1) comprises a first tracklet corresponding to a first portion of the target path denoted 310-1 in FIG. 3c and a second tracklet corresponding to a first portion of the target path denoted 315-1 in FIG. 3d. The second tracklet set (tracklet set #2) comprises a first tracklet corresponding to a second portion of the target path denoted 310-2 in FIG. 3c and a second tracklet corresponding to a second portion of the target path denoted 315-1 in FIG. 3d. The third tracklet set (tracklet set #3) comprises a first tracklet corresponding to a first portion of the target path denoted 310-2 in FIG. 3c and a second tracklet corresponding to a first portion of the target path denoted 315-2 in FIG. 3d. The fourth tracklet set (tracklet set #4) comprises a first tracklet corresponding to a second portion of the target path denoted 310-1 in FIG. 3c and a second tracklet corresponding to a second portion of the target path denoted 315-2 in FIG. 3d.

Figure 4C:
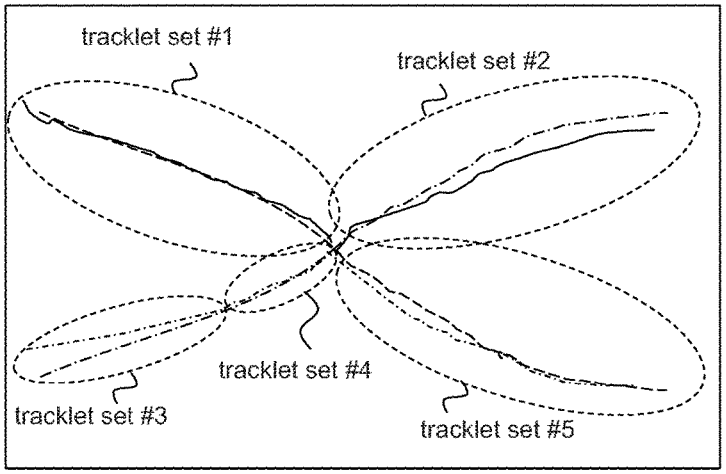

A third splitting scheme (scheme #3) is illustrated in FIG. 4c. According to this splitting scheme, the target paths illustrated in FIGS. 3C and 3d are split into five tracklet sets, each comprising two tracklets. The first tracklet set (tracklet set #1) comprises a first tracklet corresponding to a first portion of the target path denoted 310-1 in FIG. 3c and a second tracklet corresponding to a first portion of the target path denoted 315-1 in FIG. 3d. The second tracklet set (tracklet set #2) comprises a first tracklet corresponding to a third portion of the target path denoted 310-2 in FIG. 3c and a second tracklet corresponding to a second portion of the target path denoted 315-1 in FIG. 3d. The third tracklet set (tracklet set #3) comprises a first tracklet corresponding to a first portion of the target path denoted 310-2 in FIG. 3c and a second tracklet corresponding to a first portion of the target path denoted 315-2 in FIG. 3d. The fourth tracklet set (tracklet set #4) comprises a first tracklet corresponding to a second portion of the target path denoted 310-2 in FIG. 3c and a second tracklet corresponding to a second portion of the target path denoted 315-2 in FIG. 3d. The fifth tracklet set (tracklet set #5) comprises a first tracklet corresponding to a second portion of the target path denoted 310-1 in FIG. 3c and a second tracklet corresponding to a third portion of the target path denoted 315-2 in FIG. 3d.

In order to determine which of these three schemes is to be selected, the criteria described above may be used.

By applying the first criterion based on distance computation, it may be determined that the first scheme should be discarded and that another criterion should be used to decide between the second and third schemes the one that should be selected. Indeed, regarding the first scheme, it may be observed that for each of the tracklet sets, the tracklets to which they belong are very different one to the other and thus, the computed distance is high. Regarding the second and the third splitting schemes, the distance is the same. Moreover, it has a low value since for each of the tracklet sets, the tracklets to which they belong are very close one to the other.

In order to discriminate among the second and the third splitting schemes, the second criterion described above may be used. As a result of comparing the mean length of the tracklets for each of the second and the third schemes, the second splitting scheme is selected (since the mean length of the tracklets in this scheme is longer than the mean length of the tracklets in the third scheme).

It is to be noted that in order to optimize the computational time required to generate splitting schemes, the number of splitting schemes may be lowered by avoiding unrelevant schemes (from the beginning). Several standard solutions exist for creating splitting schemes.

Alternatively, instead of selecting one splitting scheme among several, an optimized splitting scheme may be created incrementally. In such embodiments, tracklets are identified iteratively.

To that end and according to particular embodiments, the first location where a target has been detected in a frame is used as a starting point of a tracklet. Then, the following frames (or the $n^{th}$ following frames when the target paths are created on a chunk basis) obtained via the same camera are iteratively considered. For each of these frames, the location of the tracked target is determined and then, a decision is taken for deciding whether the determined location is to be considered as a new point of the current tracklet or a new tracklet should be created.

This can be done by computing distances between tracklets from the different cameras, as described above, while considering the current target path to be split in view of target paths obtained from different cameras.

In practice, such a decision may be based on the result of a comparison between a first square distance and a second square distance. The first square distance may correspond to the square distance, as described above, when it is assumed that the determined location is considered as a new point of the current tracklet, while the second square distance may correspond to the square distance, still as described above, when considering that a new tracklet should be created.

More precisely, the first square distance may be equal to the square distance between the location of the considered target as identified by a first camera and the location of the same target as identified by a second camera. In other words, the tracklet set to be considered shares the same targets identifiers as before the iteration and just follows trajectories of those targets as identified by corresponding cameras. The second square distance may be the smallest square distance among square distances computed between the location of the considered target as identified by the first camera, and the location of another target as identified by the second camera and/or between the location of the considered target as identified by the second camera and the location of another target as identified by the first camera. In other words, the new tracklet set to be considered does not share all the same targets identifiers as before the iteration: one target identifier will remain, the other ones will change so as to achieve smallest square distances.

If the second square distance is greater or equal to the first one, the location of the considered target is used as a new point of the current tracklet (for each camera). Alternatively, if the first square distance is greater than the second one, the location of the considered target is used as a first point of a new tracklet (for each camera).

According to particular embodiments, noise effects may be reduced by considering one frame every n frames (n being an integer greater than one that may vary as a function of the frame rate) so that the target paths are split on a chunk basis.

Still according to particular embodiments, penalty values may be used when considering creating new tracklets so that new tracklets are created only when the square distances exhibit non-negligible square distance differences. The penalty values may be determined as a function of maximum calibration errors.

As described above by reference to FIG. 2, after having been obtained by splitting the target paths, the tracklets are combined with each other to create target trajectories. This may be done by linking a first tracklet set to a second tracklet set, the first and second tracklet sets corresponding to neighbouring portions of the target paths. The tracklet sets that are linked to each other have a high probability of corresponding to the same target. This is done for all the tracklet sets.

Several cues may be used for connecting tracklet sets.

First of all, it is to be recalled that each mono-camera tracker has its own suggestions for connecting tracklets since it provides full target paths comprising some of the tracklets of the tracklet sets that may be combined. Each mono-camera tracker has indeed one tracklet in each tracklets set. Since this tracklet is part of a trajectory determined by this mono-camera tracker, it is associated with other tracklets in other tracklets sets. These associations result from sophisticated tracking algorithm rules that are used within the mono-camera tracker. As a general rule, these tracking algorithms provide scores associated with the proposed associations. Accordingly, each mono-camera tracker has a score corresponding to each possible tracklet set association.

According to particular embodiments, the scores associated with each of the mono-camera trackers may be compared one to another so as to select tracklet set associations as a function of best scores.

Still according to particular embodiments, the probability of a tracklet set to be the right to be connected to other tracklet sets may be based on heuristics (which are not based on scores). Tracking error likelihood indeed depends on many parameters, some of which being easy to measure, like the distance between the considered camera and target, an occlusion rate, etc. Accordingly, a method for choosing tracklet sets may consist, for each tracklet set transition, in choosing a preferred transition as determined by the mono-camera tracker which has the best images of the target, in terms of tracking conditions such as light, distance, occlusion, or pose.

Still according to particular embodiments, identifying tracklet set connections is based on distances associated with re-identification between one tracklet set and the next candidate tracklet sets, in order to minimize such a distance. It is to be recalled that re-identification algorithms are usually used to detect same targets across several different cameras, thanks to machine-learning based algorithms (which compare appearances of different target images among a database of possible candidates, to detect the candidate who most likely matches one target). Such algorithms require a training step, where a general dataset of "same targets" ("positives") and "different targets" ("negatives") is used.

However, when applied to the problem of connecting tracklet sets, the problem of re-identification is simplified due to a low number of targets to be considered (i.e. a different and dedicated training databases can be used for the tracklet sets: the system may be trained among images of the same tracklet set for "positive" targets and among images of other tracklet sets known to correspond to different targets (e.g. if they are at the same time at different locations) for "negative" targets. Such embodiments prove to be efficient, robust, and generally fast.

Other methods for connecting tracklet sets may include, for example, particle filtering and other trajectory prediction-based methods.

Figure 5A:
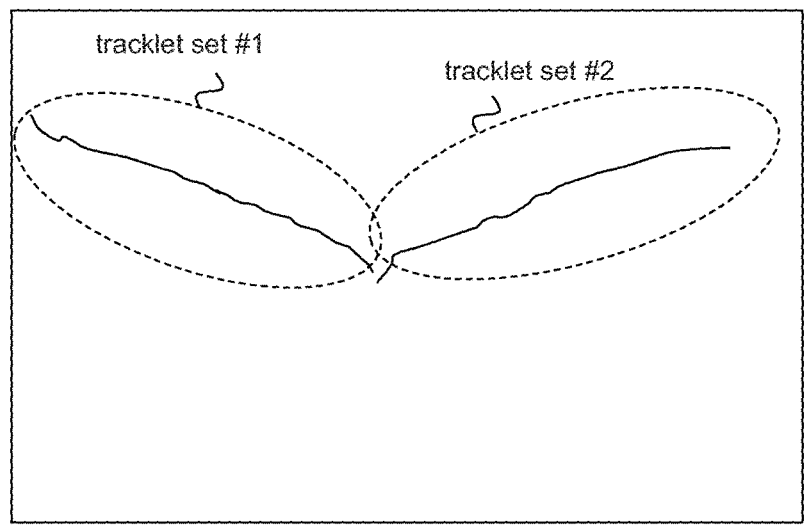
FIG. 5a and FIG. 5b, illustrates an example of different possible connections to link tracklets.
Figure 5B:
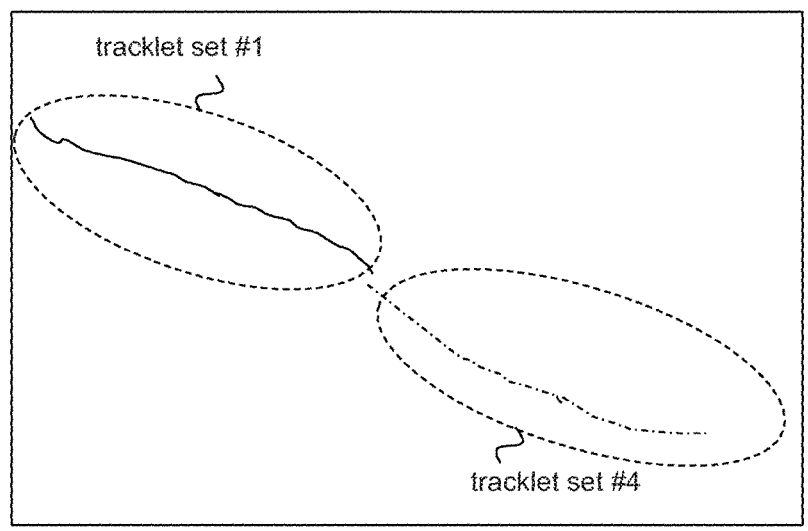

FIG. 5, comprising FIG. 5a and FIG. 5b, illustrates an example of different possible connections to link tracklet sets.

As illustrated, a trajectory chunk representative of from tracklet set #1 may be connected to a trajectory chunk representative of tracklet set #2 (FIG. 5a) or may be connected to a trajectory chunk representative of tracklet set #4 (FIG. 5b). The choice between the trajectory chunks may be determined according to the methods described previously.

Figure 6:
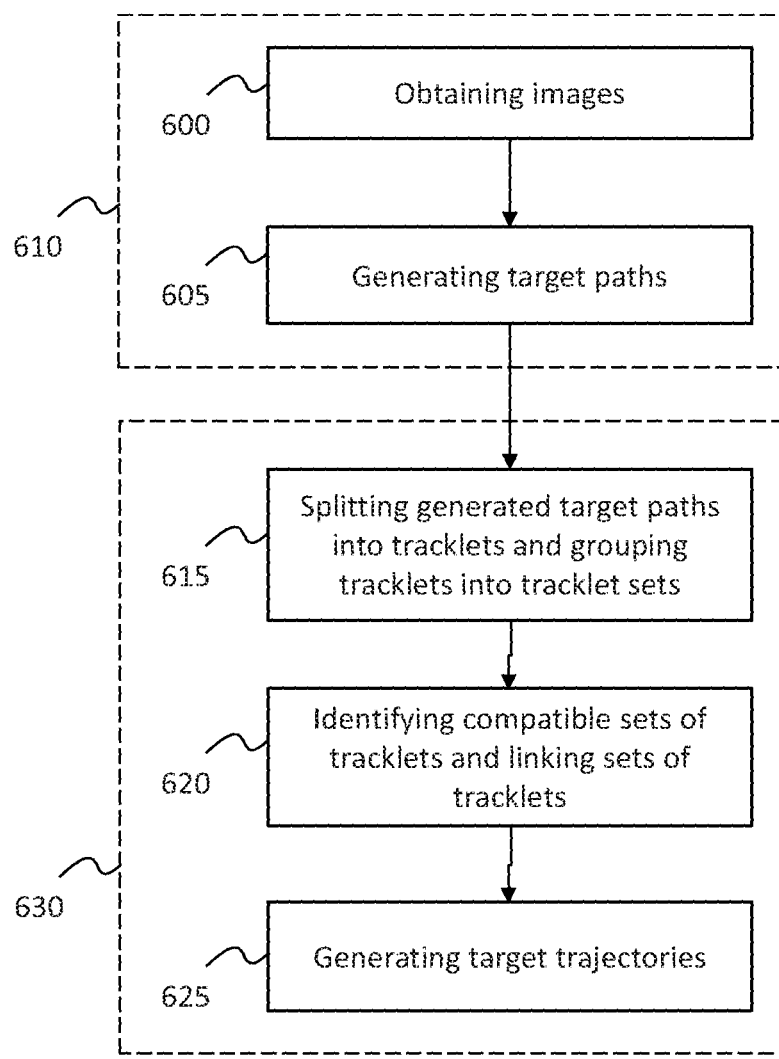
FIG. 6 is a flowchart illustrating steps of a method for generating target trajectories according to embodiment of the invention.

FIG. 6 is a flowchart illustrating steps of a method for generating target trajectories according to embodiment of the invention.

As illustrated, a first step is directed to obtaining images from a source of images (step 600). Next, the obtained images are processed to identify and to track targets so as to generate a target path for each of the identified targets (step 605).

As illustrated with reference 610, steps 600 and 605 are done for each source of images, preferably in a parallel way.

After being generated, the target paths are split into tracklets that are grouped in tracklet sets in such a way that each tracklet set comprises one tracklet associated with each of the source of images and that all the tracklets of a tracklet set are close, in terms of distance, to each other (step 615). As described above, tracklets are preferably grouped while being generated.

Again, tracklets are portions of generated target paths that are associated with a single target with a high level of reliability.

In a following step, compatibility of tracklet sets is determined for identifying pairs of tracklet sets representing trajectory chunks that may be connected one to the other and tracklet sets are linked (step 620) so as to identify the tracklet sets which trajectory chunks have to be combined for generating target path (step 625).

As illustrated with reference 630, steps 615 to 625 are steps of a fusion algorithm based on results obtained from processing data associated with single individual cameras.

Steps 615 to 625 can be carried out in a processing device of one of the cameras or in a remote processing device such as a distant server.

Figure 7:
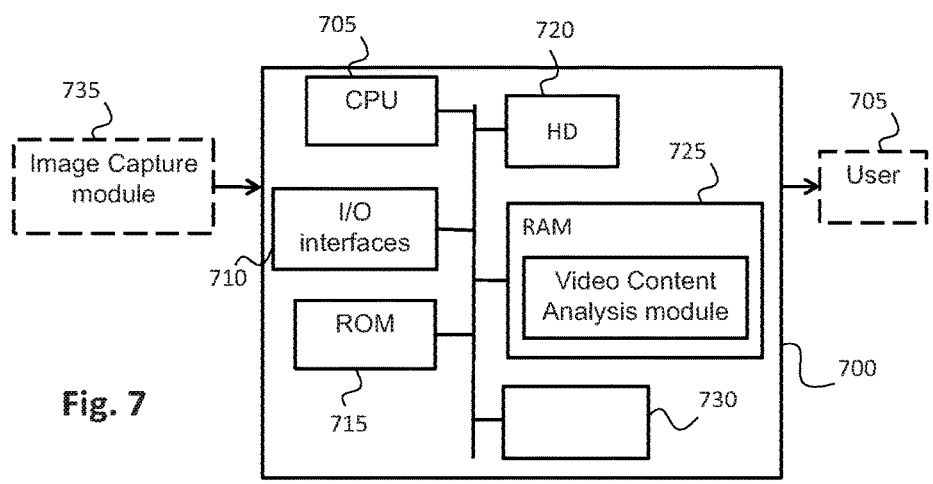
FIG. 7 is a block diagram illustrating an example of architecture for a computing device wherein embodiments of the invention can be implemented

FIG. 7 is a block diagram illustrating an example of architecture for a computing device 700 wherein embodiments of the invention can be implemented.

Computing device may be part of a video-surveillance center or may be part of a camera.

As illustrated, the computing device 700 comprises a communication bus connected to:
- a central processing unit (CPU) 705, such as a microprocessor;
- an input/output (I/O) interface module 710 for receiving data from and/or for sending data to external devices such as a video source or a display;
- a read only memory (ROM) 715 for storing computer programs, in particular computer programs for implementing embodiments of the invention;
- a hard disk (HD) 720;
- a random access memory (RAM) 725 for storing executable instructions (executable code), in particular instructions carrying out steps according to embodiments of the invention during execution as well as registers, in particular registers adapted to record variables and parameters used to implement embodiments of the invention. In particular, RAM 725 may store instructions for carrying out object tracking; and
- a communication module 730 that is typically connected to a communication network over which digital data, in particular processed data or data to be processed, are transmitted or received.

Before being loaded into RAM 725 to be executed, an executable code is preferably stored in read only memory 715. Alternatively, it can be stored in the hard disk 720 or in a removable digital medium (not represented) such as a memory key, for example a memory key conforming to the USB (Universal Serial Bus) standard.

The central processing unit 705 is adapted to control and direct the execution of the instructions or portions of executable code of the program or programs according to embodiments of the invention, which instructions are stored in one of the aforementioned storage means. After powering on, the CPU 705 is capable of executing instructions from main RAM memory 725 relating to a software application after those instructions have been loaded from the ROM 715 or the hard-disk 720 for example.

As illustrated, the computing device 700 may be connected to an image capture module 735, for example one or several cameras that provide sequences of images to the computing device 700, and to a user interface 740 which receives and displays data sent by computing device 700. Displayed data may correspond to results of a tracking algorithm according to embodiments of the invention.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method for determining a trajectory of at least one target from at least two streams of images obtained from at least two sources of images, a sub-image of each of the images of the at least two streams of images representing an overlapping area of a real scene, the method comprising:
   obtaining a target path for each of a plurality of targets, from images of the sources of images, for each of the at least two streams of images, each target path being obtained from a target tracker associated with a source of image;
   splitting each of the obtained target paths into a plurality of target path portions as a function of each potential target switch along the obtained target path;
   generating the trajectory as a function of a plurality of the target path portions;
   grouping target path portions in sets of target path portions, each target path portion of a set of target path portions belonging to a target path obtained from a different target tracker; and
   linking sets of target path portions, the trajectory being generated as a function of linked sets of target path portions.

2. The method of claim 1, further comprising a step of generating trajectory chunks representative of target path portions of sets of target path portions, the trajectory comprising combined trajectory chunks.

3. The method of claim 2, wherein the generated trajectory chunks representative of target path portions of sets of target path portions is computed as a function of target path portions of the corresponding set.

4. The method of claim 1, wherein the step of splitting each of the obtained target paths is based on an iterative process.

5. The method of claim 4, wherein the iteration is directed to locations of a target along a target path and wherein the iteration process comprises a step of determining whether a target location along a target path is to be considered as belonging to a currently created target path portion or is to be considered as a first location of a new target path protection.

6. The method of claim 5, wherein a predetermined penalty is applied when considering creating a new target path portion during the step of splitting each of the obtained target paths.

7. The method of claim 1, wherein the step of splitting obtained target paths comprises a step of creating a plurality of schemes for splitting the obtained target paths and a step of selecting a splitting scheme among the plurality of splitting schemes, the obtained target paths being split according to the selected splitting scheme.

8. The method of claim 7, wherein the step of selecting a splitting scheme is based on a distance criterion used to compare at least a distance obtained on the basis of target path portions as determined by a first splitting scheme with a distance obtained on the basis of target path portions as determined by a second splitting scheme.

9. The method of claim 8, wherein a penalty value is applied to the distance criteria when a target is not detected by a target tracker associated with a source of image, making a distance calculation meaningless.

10. The method of claim 7, wherein the step of selecting a splitting scheme is based on a length criterion of target path portions obtained from at least a first and a second splitting schemes.

11. A non-transitory computer-readable storage medium storing instructions of a computer program for implementing the method according to claim 1.

12. A device for determining a trajectory of at least one target from at least two streams of images obtained from at least two sources of images, a sub-image of each of the images of the at least two streams of images representing an overlapping area of a real scene, the device comprising a processor configured for carrying out the steps of:

obtaining a target path for each of a plurality of targets, from images of the sources of images, for each of the at least two streams of images, each target path being obtained from a target tracker associated with a source of image;

splitting each of the obtained target paths into a plurality of target path portions as a function of each potential target switch along the obtained target path;

generating the trajectory as a function of a plurality of the target path portions wherein the processor is further configured for carrying out a step of grouping target path portions in sets of target path portions, each target path portion of a set of target path portions belonging to a target path obtained from a different target tracker, and a step of linking sets of target path portions, the trajectory being generated as a function of linked sets of target path portions.

13. The device of claim 12, wherein the processor is further configured for carrying out a step of generating trajectory chunks representative of target path portions of sets of target path portions, the trajectory comprising combined trajectory chunks.

14. The device of claim 13, wherein the processor is further configured so that the generated trajectory chunks representative of target path portions of sets of target path portions is computed as a function of target path portions of the corresponding set.

15. The device of claim 12, wherein the processor is further configured so that the step of splitting each of the obtained target paths is based on an iterative process.

16. The device of claim 15, wherein the processor is further configured so that the iteration is directed to locations of a target along a target path and so that the iteration process comprises a step of determining whether a target location along a target path is to be considered as belonging to a currently created target path portion or is to be considered as a first location of a new target path protection.

17. The device of claim 12, wherein the processor is further configured so that the step of splitting obtained target paths comprises a step of creating a plurality of schemes for splitting the obtained target paths and a step of selecting a splitting scheme among the plurality of splitting schemes, the obtained target paths being split according to the selected splitting scheme.

18. The device of claim 17, wherein the processor is further configured so that the step of selecting a splitting scheme is based on a distance criterion used to compare at least a distance obtained on the basis of target path portions as determined by a first splitting scheme with a distance obtained on the basis of target path portions as determined by a second splitting scheme and/or so that the step of selecting a splitting scheme is based on a length criterion of target path portions obtained from at least a first and a second splitting schemes.

* * * * *